(12) United States Patent
Moeller

(10) Patent No.: US 9,056,444 B1
(45) Date of Patent: Jun. 16, 2015

(54) MOLDED COMPOSITE PRODUCTS, INCLUDING SOLID DOORS

(76) Inventor: David William Moeller, Flowery Branch, GA (US)

( * ) Notice: Subject to any disclaimer, the term of this patent is extended or adjusted under 35 U.S.C. 154(b) by 0 days.

(21) Appl. No.: 12/932,142

(22) Filed: Feb. 19, 2011

Related U.S. Application Data

(60) Division of application No. 12/635,782, filed on Dec. 18, 2009, now Pat. No. 8,696,958, which is a continuation-in-part of application No. 11/507,190, filed on Aug. 21, 2006, now abandoned.

(51) Int. Cl.

| | |
|---|---|
| *B32B 21/02* | (2006.01) |
| *B32B 27/42* | (2006.01) |
| *D04H 1/16* | (2006.01) |
| *B27N 3/08* | (2006.01) |
| *B27N 1/02* | (2006.01) |

(52) U.S. Cl.
CPC . *B32B 21/02* (2013.01); *B27N 3/08* (2013.01); *B27N 1/0209* (2013.01)

(58) Field of Classification Search
None
See application file for complete search history.

(56) References Cited

U.S. PATENT DOCUMENTS

| | | | |
|---|---|---|---|
| 629,448 A | 7/1899 | Leaver | |
| 1,339,134 A | 5/1920 | Redman | |
| 2,825,099 A | 3/1958 | Simmons | |
| 2,851,730 A | 9/1958 | Wilhelmi | |
| 2,907,071 A * | 10/1959 | Meiler et al. | 264/118 |
| 3,055,783 A * | 9/1962 | Hendrickson et al. | 428/74 |
| 3,231,455 A * | 1/1966 | Campbell, III et al. | 428/171 |
| 3,308,013 A | 3/1967 | Bryant | |
| 3,321,421 A | 5/1967 | Petakl | |
| 3,406,132 A | 10/1968 | Winegartner | |
| 3,734,879 A | 2/1973 | Vona et al. | |
| 3,790,417 A | 2/1974 | Paterson | |
| 4,035,120 A | 7/1977 | Eriksson | |
| 4,058,580 A | 11/1977 | Flanders | |
| 4,148,857 A | 4/1979 | Wheeler | |
| 4,194,996 A | 3/1980 | Babina | |
| 4,203,255 A * | 5/1980 | Naslund et al. | 49/399 |
| 4,236,365 A | 12/1980 | Wheeler | |
| 4,241,133 A | 12/1980 | Lund | |
| 4,514,532 A | 4/1985 | Hsu | |

(Continued)

FOREIGN PATENT DOCUMENTS

| | | |
|---|---|---|
| EP | 1 681 147 A1 | 7/2006 |
| JP | 57123038 | 7/1982 |

(Continued)

OTHER PUBLICATIONS

Abstracts, ASTM Standards D5948-05e1, D1582-98, D704,99, D705-99. D4690-99; Am. Society for Testing Materials.

(Continued)

*Primary Examiner* — Angela Ortiz
*Assistant Examiner* — Chinessa Adkins
(74) *Attorney, Agent, or Firm* — James K. Poole, Esq.

(57) ABSTRACT

Molded planar products such as solid interior and entry doors produced by molding lignocellulosic and cellulosic composite materials. The doors can be manufactured by compressing and heating a layered mixture of fine wood particles blended with thermo-set molding resins and coarse wood particles blended with thermo-set binding resins between two molds, which may contain relief patterns. The molded products are strong, solid and have hard, smooth, paint-ready outer surfaces.

21 Claims, 6 Drawing Sheets

(56) References Cited

U.S. PATENT DOCUMENTS

| | | | |
|---|---|---|---|
| 4,726,881 | A | 2/1988 | Schultz |
| 4,734,236 | A | 3/1988 | Davis |
| 4,818,595 | A | 4/1989 | Ellis |
| 4,844,968 | A | 7/1989 | Persson |
| 5,134,026 | A | 7/1992 | Melcher |
| 5,537,789 | A | 7/1996 | Minke |
| 5,543,234 | A | 8/1996 | Lynch |
| 5,759,463 | A | 6/1998 | Chang |
| 5,766,774 | A | 6/1998 | Lynch |
| 5,771,656 | A | 6/1998 | Amoretti |
| 6,180,257 | B1 | 1/2001 | Brandt |
| 6,368,528 | B1 | 4/2002 | Whelan |
| 6,479,128 | B1 | 11/2002 | Schafernak |
| 6,511,757 | B1 | 1/2003 | Brandt |
| 6,589,660 | B1 | 7/2003 | Templeton |
| 6,958,185 | B1 | 10/2005 | Zehner |
| 7,022,414 | B2 | 4/2006 | Davina et al. |
| 7,314,585 | B2 | 1/2008 | Vaders |
| 7,553,549 | B2 | 6/2009 | Liles |
| 2004/0032054 | A1* | 2/2004 | Moeller et al. ............ 264/255 |
| 2005/0266222 | A1* | 12/2005 | Clark et al. ............ 428/292.1 |
| 2006/0157183 | A1 | 7/2006 | Evers |
| 2007/0269633 | A1 | 11/2007 | Nusselder |
| 2009/0269602 | A1 | 10/2009 | Dunky |

FOREIGN PATENT DOCUMENTS

| | | |
|---|---|---|
| WO | WO 86/02292 | 4/1986 |
| WO | WO 98/50207 | 11/1998 |

OTHER PUBLICATIONS

Ahmadzandeh et al., Study on the Water Absorption and Hardness of Phenolated Oil Palm Empty Fruit Bunches (PEFB)-base Biocomposite, Iranian Polymer Journal Vo. 18 No. 3, pp. 247-255 (2009).

"Specification & Construction of Custom Stile & Rail Doors," Copper Beech Millwork, Amherst Woodworking & Supply, Northhampton, MA.

Yasar et al., The correlation of chemical characteristics and UF-Resin ratios to physical and mechanical properties of particleboard manufacturered from vine prunings, Scientific Reseearch and Essays vol. 5, No. 8 pp. 747-741 (2010).

Chapter 11, fig. 11-2, USDA Gen. Tech. Rept. FPL-GTR-190.

Falk, "Wood as a Sustainable Building Material," Chap. 1, USDA Gen. Tech. Rept. FPL-GTR-190.

A. Brent Strong, Fundamentals of Composite Manufacturing, Second Edition, Nov. 27, 2007, pp. 122-127, Society of Manufacturing Engineers, USA.

Youngquist et al., Agricultural Fibers in Composisticn Panels, in Maloney, Proceedings of 27th Intl. particleboard/composite materials symposium, ]993, Wash. State Univ., Pullman, WA.

ASTM Standard D 704-99 Melamine-Formaldehyde Molding Compounds ASTM, West Conshocken, PA, Feb. 2000.

ASTM Std. D 705-99, "Urea-Formaldehyde Molding Compounds" ASTM, Feb. 2000.

ASTM Std. D 1582-98, "Test Method for Nonvolatile Content of Liquid Phenol, Resorcinol, and Melamine Adhesives," ASTM, Mar. 1999.

ASTM Std. D 4690-99, "Urea-Formaldehyde Resin Adhesives," ASTM Jun. 1999.

ASTM Std. D 5948-05, "Std. Specification for Molding Compounds, Thermosetting," ASTM Mar. 2005.

Handbook of Thermoset Plastics, Second Edition, Chapters 1-3: Ed. Sidney Goodman; Noyes Publications, Westwood, NJ 1998.

Haque, Nawshasul—The Manufacture of Urea Formaldehyde and Phenol Formaldehyde Bonded Particleboad (Laboratory Scale) and Subsequent Comparison of Their Properties SAFS, University of /wales, Bangor, 1997—accessed at http://members.optuszoo.com.au/nhaque.

Comments on Ex. Reasons for Allowance, filed Jan. 10, 2014.

Notice of Allowance, Etc.—Nov. 21, 2013.

Req. For Continued Exam—filed Oct. 28, 2013.

Ex. Interview Summary—mailed Sep. 18, 2013.

Request for Interview filed Sep. 17, 2013 + 3 attachments.

Req. For Entry of Amdt./Reconsideration—filed Oct. 20, 2013.

Amdt. After Final Rej., filed Sep. 28, 2013.

Office Action/Final Rejection—mailed Jun. 28, 2013.

Applicant'S Comments Re Interview of Apr. 30, 2013—filed May 3, 2013.

Amendment—filed Jan. 17, 2013.

Rule 132 Declaration filed Jan. 17, 2013, less attachments.

Office Action—mailed Sep. 17, 2012.

* cited by examiner

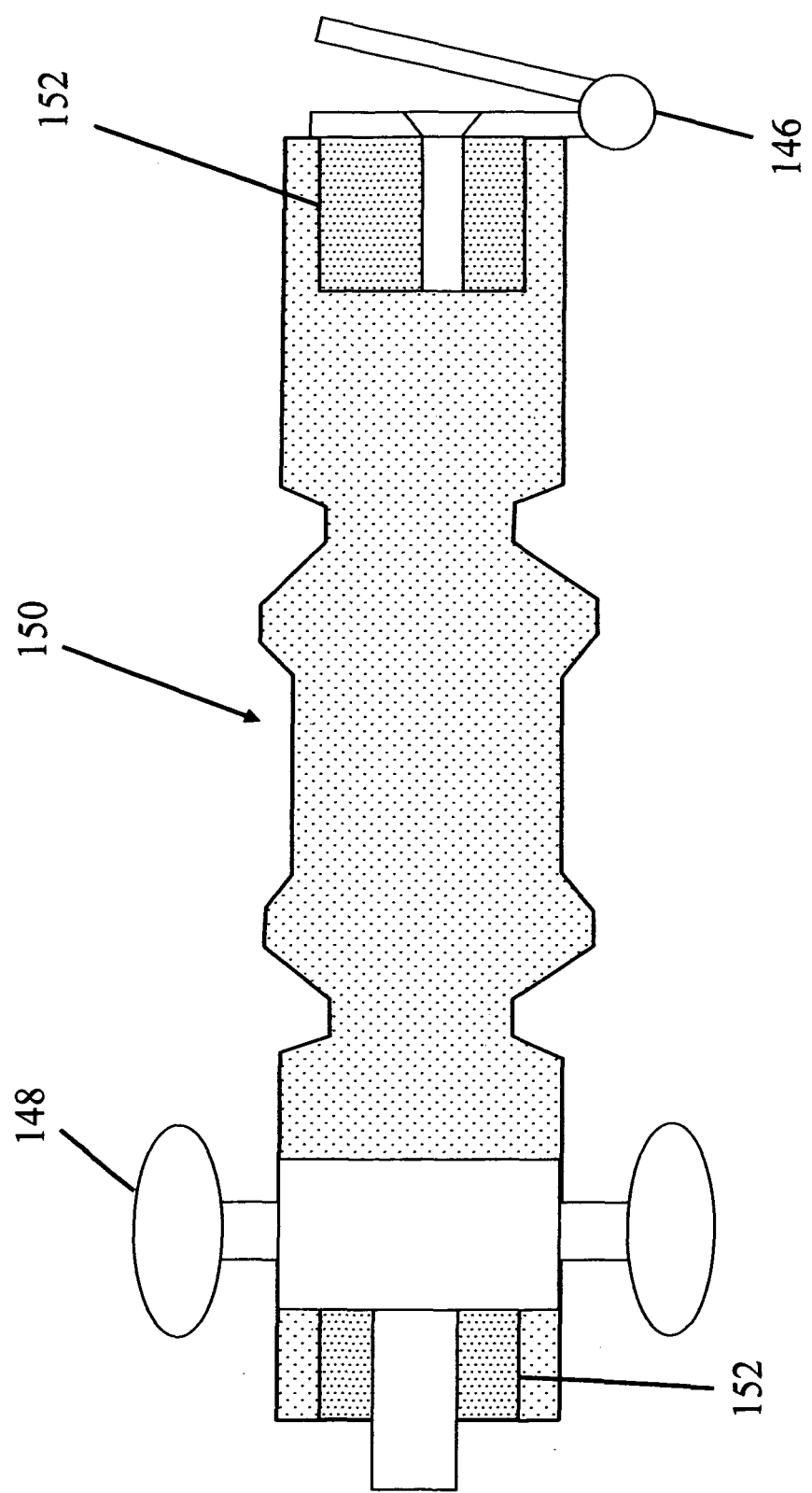

MOLDED COMPOSITE PRODUCTS, INCLUDING SOLID DOORS

CROSS-REFERENCE TO RELATED APPLICATIONS

This is a divisional of my application DWM-2, U.S. Ser. No. 12/635,782, filed Dec. 18, 2009 now U.S. Pat. No. 8,696,958, which is a continuation-in-part of my application U.S. Ser. No. 11/507,190, filed Aug. 21, 2006 for "Molded composite manufacturing Process" and now abandoned.

BACKGROUND

1. Field of the Invention

The present invention relates to molded composite interior and entry doors and a manufacturing process used to produce such doors and other products from a compressed mixture of lignocellulosic or cellulosic particles or fibers and aminoplast, phenolic, or diphenylmethane diisocyanate (MDI) thermo-set resins.

2. Description of Relevant Art

Numerous types of interior and exterior doors and methods to manufacture them exist in the prior art as do a number of molded wood composites and manufacturing methods to produce them.

Prior art such as Simmons' U.S. Pat. No. 2,825,099 issued in March 1958, and others, teach processes for manufacturing entry and interior doors from precisely cut and shaped pieces of wood. This process of manufacturing a door, where solid wood is machined into stiles, rails, and panels that are then glued and assembled into a door, is both costly and time consuming. This traditional manufacturing process is also very wasteful as typically half of the wood used in manufacture is converted into trim waste, chips, shavings, and sawdust by the various machining operations. During manufacture the surfaces of the individual components, and after assembly the surfaces of the finished door, must be sanded to achieve a surface smooth enough to produce an aesthetically acceptable painted finish.

In place of using solid wood, processes such as Amoretti's U.S. Pat. No. 5,771,656 issued on Jun. 30, 1998 and others substitute medium density fiberboard (MDF) to produce interior and entry doors. To produce these doors the MDF sheets are cut and machined into individual components that are then assembled and bonded into a completed door. The completed door is then sanded to remove glue residue from the assembly and to produce a uniformly smooth surface that will produce an aesthetically acceptable paint finish. This process is less wasteful, as MDF does not contain the knots, cracks, and other defects that must be cut out of solid wood, but it still produces waste from the various machining operations used. In addition to assembling cut and machined pieces of MDF, there are some manufacturers that produce solid interior and entry doors by taking a single thick, typically 1.375" or 1.750", sheet of MDF or low density fiberboard (LDF) and then use routers to machine designs to simulate stiles, rails, and panels into both faces. The door is then trimmed to size and painted to produce a unit that has the appearance of a solid door. While the doors produced using these methods are solid and durable, the expense and waste associated with the various machining process results in a door that is still costly to produce.

The process found in Leavers U.S. Pat. No. 629,448 issued on Jul. 25, 1899, reduced the cost of mass-producing doors by attaching door skins to a frame to produce a hollow core door with the appearance of a solid door. While the use of lower cost materials increases the overall efficiency of manufacturing doors, the process still requires two door skins be produced in one manufacturing process and then bonded to a dimensioned and assembled frame of wood or other materials with sufficient screw-holding capability for mounting the hinges and lock-set in a second manufacturing process. Once assembled, the hollow core door is trimmed before applying the finish. It should be pointed out that a hollow core door is more subject to damage than a solid door and they do not muffle sounds as effectively as a solid door. To mitigate this deficiency, methods such as found in Lynch, et. al. U.S. Pat. No. 5,766,774 issued on Jun. 16, 1998 and others have filled the void between the two door skins with cardboard, foam, particleboard, and other fillers, which increases the cost of the door.

The production of molded items using thermo-set molding resins blended with wood flour, glass fibers, and other materials exists in the prior art. An early example is the use of phenol-formaldehyde resins blended with wood flour that was marketed in the 1920's under the trade name of Bakelite®. These mixtures produced molded parts using both injection molding and compression molding in closed molds. In the case of compression molding, the blends are often pre-heated to form a bulk molding compound that is then subdivided into individual measured charges or shots that are placed inside the cavity of the mold. The molds are then closed and the charge is subjected to heat and pressure until the mixture has cured. This process produces quality molded items but it requires both a more complex manufacturing process and produces a more costly product as it uses only thermo-set molding resins which are more costly and require higher dosing levels than do thermo-set binding resins. In addition, the molding of products from these blends requires the use of elaborate and expensive closed molds that create a sealed cavity to prevent the material from flowing out of the mold during molding. Davis, U.S. Pat. No. 4,734,236, Mar. 29, 1988 and others have produced molded composites using blends of wood fibers and other materials and thermo-set molding resins without the use of pre-heating, but they still require the use of closed molds.

Molded composites produced using blends of thermo-set binding resins are taught by Vanders, U.S. Pat. No. 7,314,585, Jan. 1, 2008 and others. These composites benefit from using lower cost thermo-set binding resins mixed with wood chips, veneers, particles, and fibers to produce a shaped product of uniform to near uniform thickness. They also benefit from the fact that this material does not flow during molding so that simple and lower cost open molds can be utilized. However the surface finishes of these products are not smooth, hard, and paint-ready and as such are used primarily for structural applications, such as door cores, or in other applications where a paint-ready surface finish is not required. To overcome this deficiency, Whelan, et al., U.S. Pat. No. 6,368,528, Apr. 9, 2002 developed a process where an aqueous solution containing resins and other materials is applied to the surface of a wood and resin mat prior to molding so that a smooth, hard, paint-ready surface is produced. While producing a desirable surface finish, this process adds to the cost and complexity of the manufacturing process.

In view of the foregoing disadvantages and limitations found in the prior art of manufacturing doors, there is an interest in and need for improved processes for manufacturing doors and other similar products.

SUMMARY

In one embodiment, a molded composite manufacturing process is provided for producing solid core molded planar objects employing a compression method of forming the objects between two molds using composite materials comprising mixtures of particles prepared from agricultural or forest byproducts and thermo-set resins, comprising steps of:

preparing and applying a first face layer of a first composite material comprising form about 10 to about 60 percent by weight of a thermo-set molding resin and from about 40 to about 90 percent by weight of fine particles of these byproducts by applying the first face layer composite material over a first mold, preparing and applying a core layer comprising a composite material comprising from about 5 to about 20 percent by weight of a thermo-set binding resin and from about 80 to about 95 percent by weight of coarser particles of the byproducts to cover the first face layer, preparing and applying a second face layer comprising from about 10 to about 60 percent of thermo-set molding resin and from about 40 to about 90 percent by weight of the fine particles to cover the core layer, then placing a second mold over the first mold and the face and core layers deposited thereon to contain and compress the layers of composite materials, and heating these layers between the two molds to a temperature in the range of from about 210 to about 410 degrees F. while compressing the composite layers between the molds at a pressure in the range of from about 300 to 900 psi for a time effective to cure the composite materials.

The thermo-set molding and binding resins are prepared or procured as described below, and have distinct functional characteristics. The molding resins can comprise at least one aminoplast or phenolic resin, while the thermo-set binding resins can comprise at least one aminoplast, phenolic, or MDI resin. The fine and coarser particles can contain particles of various shapes and sizes, including fibers of the lignocellulosic materials used, and are prepared as described below to provide absolute and relative size ranges suitable for the requirements of the molding process.

Further embodiments include molded planar objects produced by the process described above, which can be doors or other useful objects. The outer faces can include various types of relief patterns produced by relief patterns in the molding surfaces. Fire retardant chemicals of various types can be added to the composite materials of the face and/or core layers to produce a molded planar object (such as a door) which is fire rated. When doors are produced, additional layers of core layer material can be deposited between specific layers of at least one of the face layers of composite materials to increase the strength and density of the door in areas preselected as locations for hinge and lockset installations. The process of compression and curing is conducted so as to form smooth, hard face surfaces on the molded object which are ready to be primed and painted or powder coated without the need for sanding or other surface preparation. In a further refinement of the process, the composite material comprising the first face layer, the core layer, and the second face layer can be consolidated by pre-pressing the layers before compressing the final assembly.

Thus, molded planar objects are provided which comprise two face layers of cured composite materials comprising from about 10 to about 60 percent by weight of a thermo-set molding resin and from about 40 to about 90 percent by weight of fine particles prepared from agricultural or forest byproducts, the face layers enclosing a core layer of cured composite material comprising from about 5 to about 20 percent by weight of a thermo-set binding resin and from about 80 to about 95 percent by weight of coarser particles, also prepared from agricultural or forest byproducts.

The present embodiment is a single compression molded composite manufacturing process that uses a mixture of thermo-set resins and lignocellulosic (forest byproducts such as wood, industrial wood waste, urban wood waste, and the like) or cellulosic (agricultural byproducts such as wheat straw, rice straw, corn stover, bagasse and the like) particles or fibers to form the product. For example, a door with a relief face and back can be manufactured in one operation by compressing and heating a blend of industrial wood waste particles and thermo-set resins between two molds. The present embodiment eliminates the multiple steps found in the prior art of cutting, machining, and assembly of individual components to produce a door.

The terms wood materials and wood particles have been used in the following sections for brevity and clarity and should not be considered as limiting as a variety of lignocellulosic and cellulosic particles and/or fibers may be utilized.

One embodiment is a solid wood composite door that comprises at least one, and preferably two smooth, hard, paint-ready faces that comprise a blend of fine wood particles and aminoplast or phenolic thermo-set molding resins (for example, melamine-formaldehyde, phenol-formaldehyde, or urea-formaldehyde) that may have optional decorative relief patterns molded into them and a solid core that comprises a blend of coarse wood particles and aminoplast, phenolic, or MDI thermo-set binding resins (for example, urea-formaldehyde, melamine-formaldehyde, phenol-formaldehyde, or MDI) and processes used to produce it.

Aminoplast resin is a class of thermosetting resins made by the reaction of an amine (typically urea or melamine) with an aldehyde (typically formaldehyde). Phenolic resin is a class of thermosetting resins obtained by the condensation of phenol or substituted phenols with aldehydes such as formaldehyde, acetaldehyde, and furfural. Phenol-formaldehyde resins are typical and the chief class of phenolics.

The terms "thermo-set molding resin" and "thermo-set binding resin" are used to differentiate between the performance characteristics associated with each. Thermo-set molding resins are formulated to have a prolonged thermoplastic phase that allows the resin to flow and conform to the shape of the mold prior to its cross linking and curing. The fine wood particles that the thermo-set molding resin is mixed with act primarily as a filler. Specifically, in the case of phenol-formaldehyde molding resin, the resin is a novolac and is produced in an acid catalyzed reaction of formaldehyde with an excess of phenol. Hexamethylenetetramine (Hexa) or similar material is then added as a crosslinker. As this resin bonds, it emits ammonia as a byproduct of the reaction. The thermo-set binding resin is formulated to react quickly and form discrete bonds between the individual wood particles it has been blended with. Specifically, in the case of phenol-formaldehyde binding resins, the resin is a resol that is produced in a basic reaction of phenol with an excess of formaldehyde. As this resin bonds it emits formaldehyde. There are similar differences in the performance characteristics and chemical reactions used to produce aminoplast (urea-formaldehyde and melamine-formaldehyde) molding and binding resins.

This door is produced in a compression molded composite manufacturing process where wood materials such as sawdust, shavings, and chips are fed into the process. The wood materials are then dried in a purpose built dryer. The dried wood materials are then milled into small irregularly shaped particles and/or fibers using a hammermill and then classified by screens into fine and coarse fractions.

The fine wood particles are then blended with a thermo-set molding resin and the coarse wood particles are blended with a thermo-set binding resin. These blends are then used to form a layered mat that comprises three layers (a first face layer of fine wood particles blended with a thermo-set molding resin overlaid by a thicker core layer of coarse wood particles blended with a thermo-set binding resin and then overlaid by a second face layer of fine wood particles blended with, thermo-set molding resin).

This layered mat is then placed and compressed between two heated open molds. The compressed layered mat is held between the heated molds until sufficient time has passed to allow for the heat from the molds to raise the temperature of the compressed mat to the point that the thermo-set resins in the mixture react and form the molded composite door. The molded composite door is then removed from between the molds. The molded composite door is then trimmed to the correct size. The trimmed door may then have the edges machined and a wood insert installed. The trimmed molded composite door, with or without wood insert, is now ready to be machined to accept a lockset and hinges, painted, and then shipped or hung in a door opening. The present embodiment eliminates the multiple steps and waste found in the prior art of cutting, machining, and assembly of individual components to produce a door. The door produced is a solid composite so that the deficiencies associated with hollow core doors are avoided. The door produced leaves the molds with smooth, hard, paint-ready faces that do not require the application of surface treatments prior to molding or sanding or application of fillers or sealers after molding that other composites produced from blends of wood particles, fibers, or chips and thermo-set binding resins require to achieve an aesthetically acceptable painted finish on the faces.

The term "smooth" refers to the accurate replication of the mold surface and the absence of any surface voids that would detract from the uniformity of the surface appearance. This is evaluated by taking a length of chalk in hand and manually stroking it across the flat surface to be tested with sufficient pressure so as to leave a broad chalk mark across the surface. Any surface voids appear as unmarked areas within the chalk marked area on the surface tested. The size and number of voids detected determine if an acceptable level of surface uniformity has been achieved.

The term "hard" is used to describe the scratch resistance of the faces as measured by their performance using a sharpened steel stylus that is weighted and dragged across the surface being tested. In testing it was found that the surface of the door produced by the process described above was not scratched until a load of about 85 grams had been applied to the stylus. By comparison, scratch testing of various wood species found that red oak and hard maple had similar levels of scratch resistance while species such as poplar, pine, and alder all exhibited scratch damage at lower load levels The term "paint-ready" refers to both how well paint adheres to the molded surface of the door and whether the painted surface is free from visible defects that are a result of defects in the door surface. The adhesion level of the paint is measured by cutting two sets of eleven parallel lines 1 mm apart perpendicular to each other with a purpose-built tool to produce one hundred 1 mm by 1 mm squares. Test tape is then applied to the surface and then peeled off. The number of squares that remain adhered to the painted surface is a measure of the adhesion level. In testing it was found that the surface of the door produced by the process described above retained 98 to 100 of the test squares when tested. For comparison, sanded MDF and sanded poplar were also tested and were found to retain 100 test squares when tested. Examination of the painted surface for defects is a simple visual inspection of the surface with the surface illuminated by lights that are directed so that they are close to parallel to the surface being inspected.

The embodiment described above does not require the blend pre-heating step or the higher costs associated with using blends containing only thermo-set molding resins to produce the molded product. The majority of the mixture used in the embodiment is a blend of thermo-set binding resins and coarse wood particles that do not flow during compression molding, so closed molds are not required, while the use of blends containing only thermo-set molding resins requires the use of closed molds to retain the blend within the confines of the mold during compression molding.

The present embodiment provides a means for the compression molding of a composite interior door, entry door, or another product having a depth of relief or detail that can not be achieved economically through the embossing of a previously manufactured panel. The embodiment also provides a means for molding into the faces both convex and concave decorative details without voids or surface defects.

Another aspect of the embodiment is to provide for the depositing of additional core layer material in sections of the mat that correspond to the locations of the stiles (the vertical edges of the door) in the finished doors. This additional material will create a core of higher density in those areas in the finished door. These higher density areas will have increased screw holding capability and will result in improved retention of the hinges and lockset when the door is hung in the opening.

Another aspect of the present embodiment is to provide for the incorporation of fire retardant chemicals such as boric acid, zinc chloride, or other commercial fire retardants into the core material so as to produce a fire rated door to comply with building codes for certain types of construction projects. The incorporation of fire retardants into particleboard is taught by Petaki, et. al. in U.S. Pat. No. 3,321,421 issued on May 23, 1967, which is incorporated herein by reference.

The foregoing and other aspects are intended to be illustrative of the embodiments and are not meant to establish limits. Many possible embodiments of the invention may be devised and will be readily evident upon a study of the following specification, including the appended claims, and accompanying drawings comprising a part thereof. Other aspects and advantages of this embodiment will become apparent from the following description taken in connection with the accompanying drawings, wherein are set forth by way of illustration and example, certain embodiments.

BRIEF DESCRIPTION OF THE DRAWINGS

The invention will be better understood and aspects other than those set forth above will become apparent when consideration is given to the following detailed description thereof. The same numerals are used to designate like components in these figures. Such description makes reference to the annexed drawing wherein:

FIG. 6 depicts a cross section of a finished molded door with wooden inserts installed in the stile edges and with hinges and lockset installed.

DETAILED DESCRIPTION OF PREFERRED EMBODIMENTS

With reference to FIGS. 1, 2, 3, 4, 5, and 6, preferred embodiments of the invention are illustrative of the best modes and application of the principles set forth in the following description. The expression "A and/or B" is used in the conventional sense, meaning that A, B, or A+B can be present. Note, all temperatures are in degrees Fahrenheit and pressures are in pounds per square inch.

Figure 1:
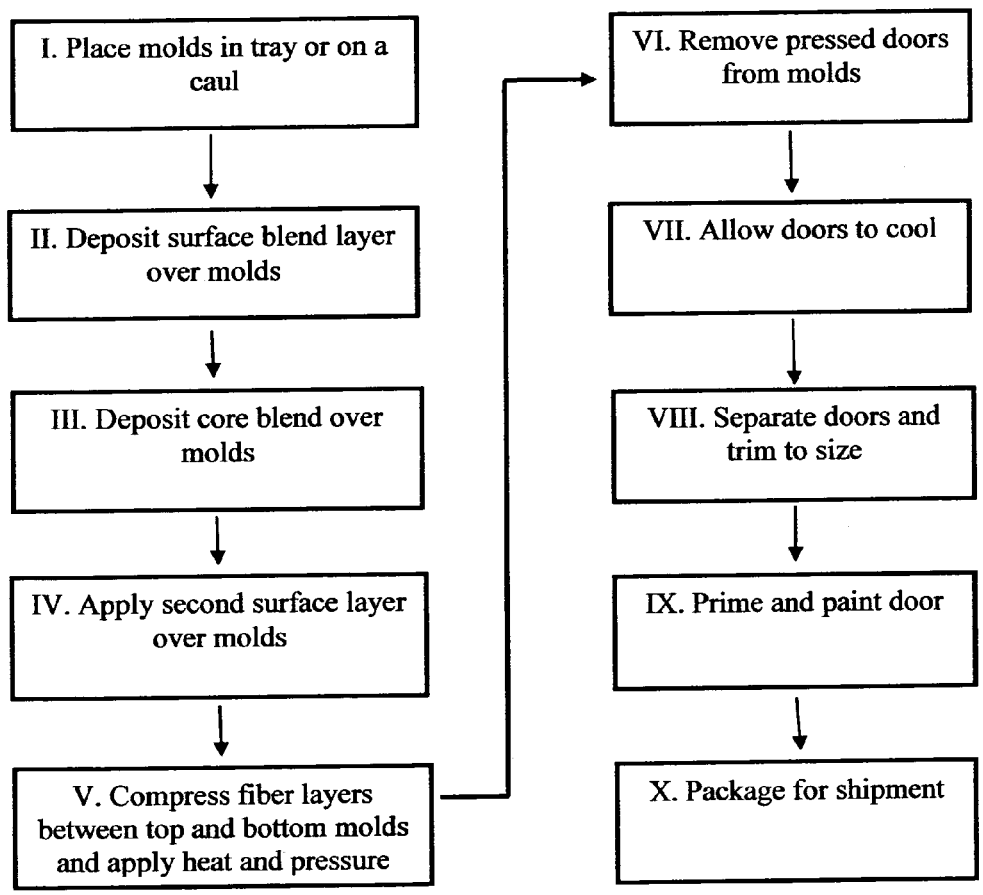
FIG. 1 is a labeled representation of the process flow of one embodiment of the invention.

FIG. 1 is a flowchart of one embodiment of the present invention wherein the multiple steps of cutting, machining, and assembly presently required to manufacture a solid wood or hollow core door are reduced to one operation. The invention embodies the manufacturing process of compressing and heating a mixture of wood or agricultural waste and thermo-set resins between two molds to produce a door with all of the performance characteristics of one made of solid wood.

With reference to FIG. 1, Step I, one embodiment of the invention is to place the molds in a tray or on a caul so that they can be transported under the feeders on their way to the press. The molds pass under the first feeder, Step II, where a face blend comprised of fine wood particles and resin is deposited in a uniform layer over the mold surface. The molds then move to the second feeder wherein a core blend (a mixture of coarser wood particles and resin) is deposited, Step III, either uniformly over the surface layer or with additional material added to specific areas to strengthen the perimeter of the door for hinge and lockset retention. Having completed Step III, the assembly moves to a third feeder, Step IV, where the top face layer is added to form a three layer mat. The assembly then moves to the heated press, Step V, where the layers are compressed to the thickness of the finished product between the top and bottom molds. The heated press is closed thereby bonding the resins and wood fiber to form a solid composite panel. The panel is removed from the molds, Step VI, and allowed to cool in Step VII. Each door is then trimmed to size, Step VIII, and primed and painted, Step IX, before being packaged for shipment in Step X.

Figure 2:
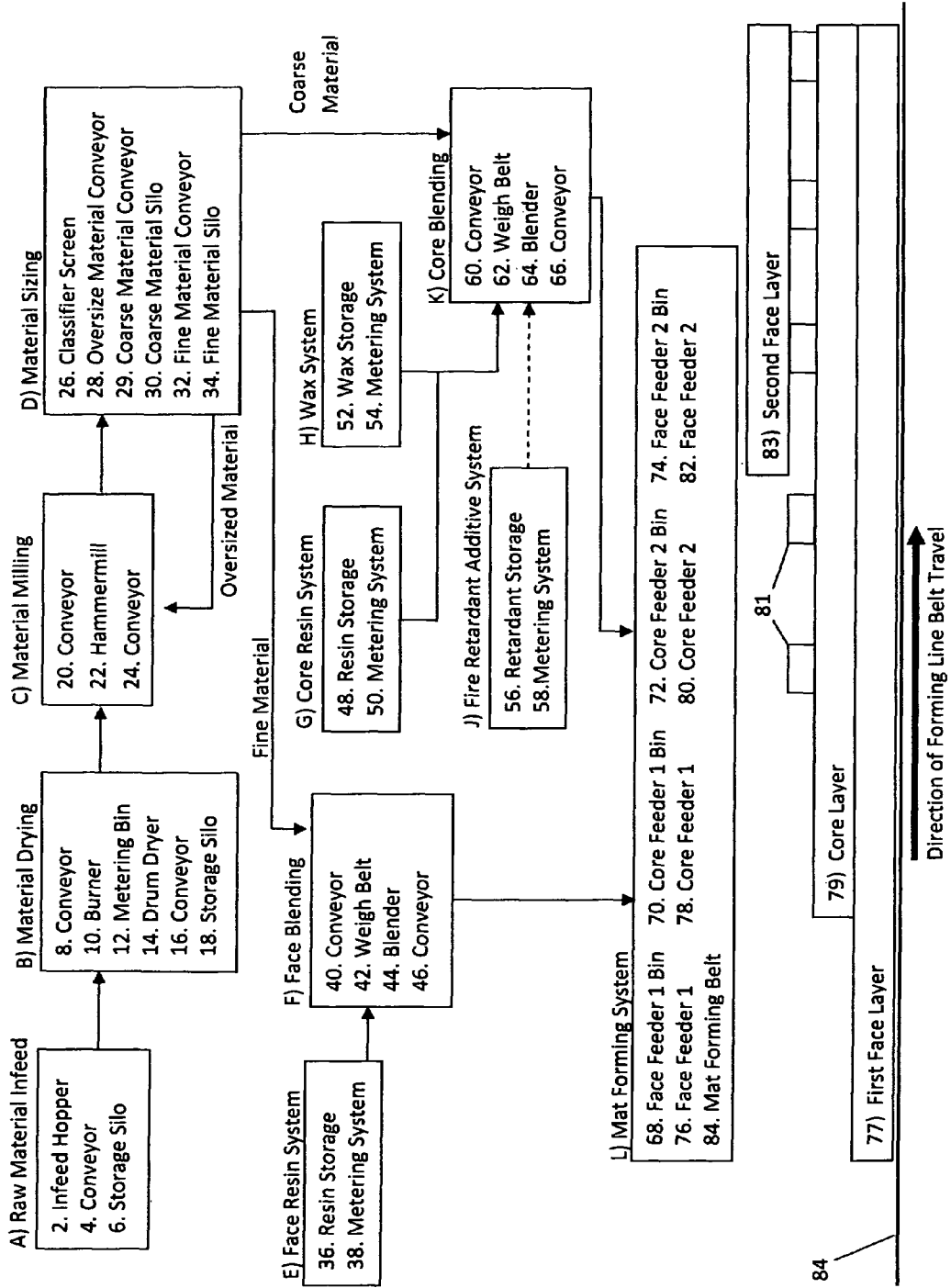
FIG. 2 is a labeled schematic diagram showing the process flow of the wood material preparation, blending, and mat forming portions of the manufacturing process of a second embodiment of the invention.

FIG. 2 is a labeled schematic diagram that shows the process flow of a second embodiment wherein the wood material preparation, blending, and mat forming portion of the manufacturing process is shown.

With reference to FIG. 2, Step A, depicts the raw material infeed portion of the system where the wood materials (chips, sawdust, shavings, and the like) that are obtained from solid wood processing, industrial wood waste, urban wood waste, and the like, are fed into the process by placing the wood materials into the infeed hopper (2). The infeed hopper (2) then discharges the wood materials at a steady rate onto the conveyor (4) which transports them to the first storage silo (6) where the wood materials are stored until they are ready to be dried.

Material drying, Step B, is where the wood materials are dried using heated air to remove excess moisture. The wood materials are discharged from the first storage silo (6) onto the conveyor (8) that transports them to the metering bin (12). The wood materials are then discharged from the metering bin (12) in a controlled manner into the drum dryer (14). Heated air is fed into the drum dryer (14) from the burner (10). The burner (10) is fueled by natural gas, wood waste, or other suitable fuels. The wood materials are exposed to the heated air in the drum dryer (14) at sufficient temperature and time so that the moisture content of the wood materials is reduced to 5 to 8 percent when mixed with spray dried resins and 2 to 4 percent with liquid resins. The dried wood materials then exit the drum dryer (14) and are discharged onto a conveyor (16) which transports them to a second storage silo (18) for storage until they are ready to be milled.

Material milling, step C, is where the dried wood materials are reduced in size so that they can be utilized in the process. The dried wood materials are discharged from the second storage silo (18) onto a conveyor (20) that transports them to the hammermill (22). The hammermill (22) contains rotating hammers and fixed screens that work in concert with each other to convert the incoming dried wood materials into small particles and/or fibers. The milled wood particles exit the hammermill (22) and are discharged onto a conveyor (24) for transport to the material sizing portion of the process.

Material sizing, step D, is where the milled wood particles are classified into three distinct size classifications. The milled wood particles are fed into the classifier screen (26) by a conveyor (24). The classifier screen (26) contains two layers of screens. The top layer of screens are a coarse size (e.g., about 8 to 20 Tyler mesh, 0.094" to 0.033" opening) and the lower level of screens are a fine size (e.g., about 35 to 60 Tyler mesh, 0.017" to 0.010" opening). The milled wood particles that are too large to pass through the coarse screen layer are discharged from the classifier screen (26) onto the oversize material conveyor (28) which transports them back to the hammermill (22) for additional size reduction. The milled wood particles that are small enough to pass through the coarse screen layer but too large to pass through the fine screen layer are discharged from the classifier screen (26) onto the coarse material conveyor (29) which transports them to the coarse material silo (30) for storage. The milled wood particles that are small enough to pass through both the coarse and fine screen layers are discharged from the classifier screen (26) onto the fine material conveyor (32) which transports them to the fine material silo (34) for storage.

Face blending, step F, is where the fine material is blended with the thermo-set molding resin. The fine material is discharged from the fine material silo (32) onto the conveyor (40) which transports it to the weigh belt (42) which reads the weight of material being fed into the blender (44). The weigh belt feeds it into the blender (44) where the fine material is mixed with the thermo-set molding resin. It is common practice to add a small amount of zinc sterate (typically less than 1%) to the face blend to improve the release characteristics of the mold. The resulting blended material is discharged from the blender (44) onto the conveyer (46) that transports it to the face feeder 1 bin (68) and face feeder 2 bin (74).

The face resin system, step E, is where the face resin is stored in resin storage (36) and is metered to the blender (44) by the metering system (38). The metering system (38) uses the weight information from the weigh belt (42) to adjust the amount of thermo-set molding resin sent to the blender (44) so that the correct ratio of thermo-set molding resin and fine material (generally about 10 to 50 percent resin by weight) is maintained.

Core blending, step K, is where the coarse material is blended with the thermo-set binding resin. The coarse material is discharged from the coarse material silo (30) onto the conveyor (60) which transports it to the weigh belt (62) which reads the weight of material being fed into the blender (64).

The weigh belt feeds it into the blender (64) where the coarse material is mixed with the thermo-set binding resin. The resulting blended material is discharged from the blender (64) onto the conveyer (66) that transports it to the core feeder 1 bin (70) and core feeder 2 bin (72).

The core resin system, step G, is where the core resin is stored in resin storage (48) and is metered to the blender (64) by the metering system (50). The metering system (50) uses the weight information from the weigh belt (62) to adjust the amount of thermo-set binding resin sent to the blender (64) so that the correct ratio of thermo-set binding resin and coarse material (generally about 5 to 20 percent resin by weight) is maintained. It should be noted that varying the ratio of thermo-set binding resin to coarse material changes the performance characteristics of the product.

In addition to the thermo-set binding resin, a small amount of wax (generally about 0.5 to 1 percent by weight) can be added to the core blender by the wax system, step H, so that the core has improved moisture resistance. The wax is stored in wax storage (52) and is metered out by the metering system (54) to the blender (64). The amount metered out by the metering system (54) is adjusted based on the weight information provided by the weigh belt (62).

To produce fire rated doors, fire retardant additives are added to the core blend by the fire retardant additive system in step J. The fire retardant chemicals (which can be boric acid and other suitable compounds) are stored in retardant storage (56) and are metered to the blender (64) by the metering system (58) using the weight information provided by the weigh belt (62) to maintain the correct ratio of retardant additive (generally about 5 to 15 percent by weight) to the core resin and coarse wood particle blend.

The type of thermo-set molding resin selected is generally determined by the amount of moisture resistance desired in the door faces (Melamine-formaldehyde has the greatest water resistance, phenol-formaldehyde is less water resistant, and urea-formaldehyde is the least water resistant) and economic considerations (Melamine-formaldehyde is the most costly, phenol-formaldehyde less costly, and urea-formaldehyde the least costly). In testing it has been found that all three of these types of thermo-set molding resins worked well and each produced smooth, hard, paint-ready faces on the molded door. The ratio of molding resin to fine wood particles is determined by which molding resin is selected, and how hard and smooth the faces of the finished doors need to be. In the case of melamine-formaldehyde and urea-formaldehyde it was found that a minimum of 30% resin was required to achieve an acceptable surface and that a mixture of 60% produced a very smooth and hard surface. In the case of phenol-formaldehyde it was found that a minimum of 10% resin was required to achieve an acceptable surface and that a mixture of 20% resin produced a very smooth and hard surface.

The type of thermo-set binding resin selected is generally determined by the amount of moisture resistance desired (melamine-formaldehyde and MDI being the most moisture resistant, phenol-formaldehyde less water resistant, and urea-formaldehyde the least water resistant), bonding speed (MDI and urea-formaldehyde bonding quickly and phenol-formaldehyde and melamine-formaldehyde bonding more slowly), and economic considerations (MDI and melamine-formaldehyde being the most costly, phenol-formaldehyde less costly, and urea-formaldehyde the least costly). In testing it has been found that all four types of the listed thermo-set binding resins worked well and produced doors with acceptable internal bond, screw holding, and structural performance. Other related types of thermo-set binding resins have not been tested but may also prove to be acceptable for use in this embodiment. The ratio of binding resin to coarse wood particles is determined by which binding resin is selected and the structural performance level required in the final product. In the case of urea-formaldehyde, melamine-formaldehyde, and phenol-formaldehyde, it was found that 8% to 15% was required to achieve sufficient bond strength. In the case of MDI, it was found that 5% to 8% was required to achieve an acceptable level of structural performance. The smaller amount of MDI required is due to it being supplied as a liquid that contains 100% MDI while the other resins are supplied as mixtures of resin and water that contain 50% to 70% resin. Likewise, if spray dried versions of urea-formaldehyde, phenol-formaldehyde, or melamine-formaldehyde are used the amount used would be reduced to the 5% to 8% range.

With the face and core material prepared and sent to the respective feeders, the layered mat is ready to be deposited on the mat forming belt (84). The mat forming belt (84) is a wide continuous belt that travels continuously under the feeders. In this embodiment the width of the mat being formed is approximately 4 inches to 6 inches greater than the height of the finished doors that will be produced (typically 80 inches, 84 inches, or 96 inches) so that the mat forming belt (84) will typically be 6 inches wider than the maximum mat width that is to be formed.

The mat forming system, step L, begins with face feeder 1 bin (68) feeding the blended face material into face feeder 1 (76). Face feeder 1 (76) deposits the first face layer (77) uniformly across and along the mat forming belt (84) at a controlled application rate of about 0.2 to 0.7 pounds of material per square foot. The actual application rate chosen is determined by the depth of relief to be produced, since greater relief requires a higher application rate, and the target density of the pressed door, since higher density requires a higher application rate. Specifically for the production of a 1.375" thick interior door using molds that contain moderate relief, the application rate would be 0.2 to 0.5 pounds per square foot. The mat forming belt (84) with the first face layer (77) on it then travels to a position under core feeder 1 (78). Core feeder 1 bin (70) feeds blended core material into core feeder 1 (78). Core feeder 1 (78) deposits the core layer (79) uniformly over and across the first face layer at a controlled application rate of about 1.5 to 6.0 pounds of material per square foot. The actual application rate is determined by the door thickness, since thicker doors require higher application rates, and door density, since denser doors require higher application rates, to be produced. Specifically for the production of a 1.375" thick interior door using molds that contain moderate relief, the application rate would be 3.4 to 5.3 pounds per square foot.

The mat forming belt (84) with the first face layer (77) and the core layer (79) on it then preferably travels to a position under core feeder 2 (80) where additional core material (81) is deposited in a band across the mat forming belt (84) by cycling core feeder 2 bin (72) and core feeder 2 (80) on and off in a timed cadence that results in the deposition of additional core material (81) at predetermined locations on the mat that correspond to the locations of the door stiles (the vertical edges of the finished door where the hinges and lockset are mounted) in the mold. Core feeder 2 (80) deposits between about 0.2 and 1.5 pounds of material per square foot over the first face layer (77) and the core layer (79) in these positions. This additional core material (81) will result in the stiles of the finished doors having greater density, which will increase the strength (MOR), stiffness (MOE), and screw holding ability of the door stiles.

The mat forming belt (84) with the first face layer (77), core layer (79), and periodic additional core material (81) then travels to a position under face feeder 2 (82) where the second face layer (83) of face material is uniformly deposited over the mat. Face feeder 2 bin (74) feeds face material to face feeder 2 (82). Face feeder 2 (82) uniformly deposits the same amount of material on the moving mat as face feeder 1 (76) did unless different thicknesses are to be formed in the two faces. The mat forming belt (84) then carries the first face layer (77), core layer (79), periodic additional core material (81), and second face layer (83) downstream as a layered mat to the next steps in the manufacturing process. It should be noted that the speed of the mat forming belt (84) is adjusted so that the layered mat is produced at a rate that matches the consumption rate of the downstream steps so that the mat forming system runs as a continuous process without routine stoppages. The speed of the mat forming belt (84) is also used to control the feed rate of the face and core feeders so that the desired application rates are maintained.

Figure 3:
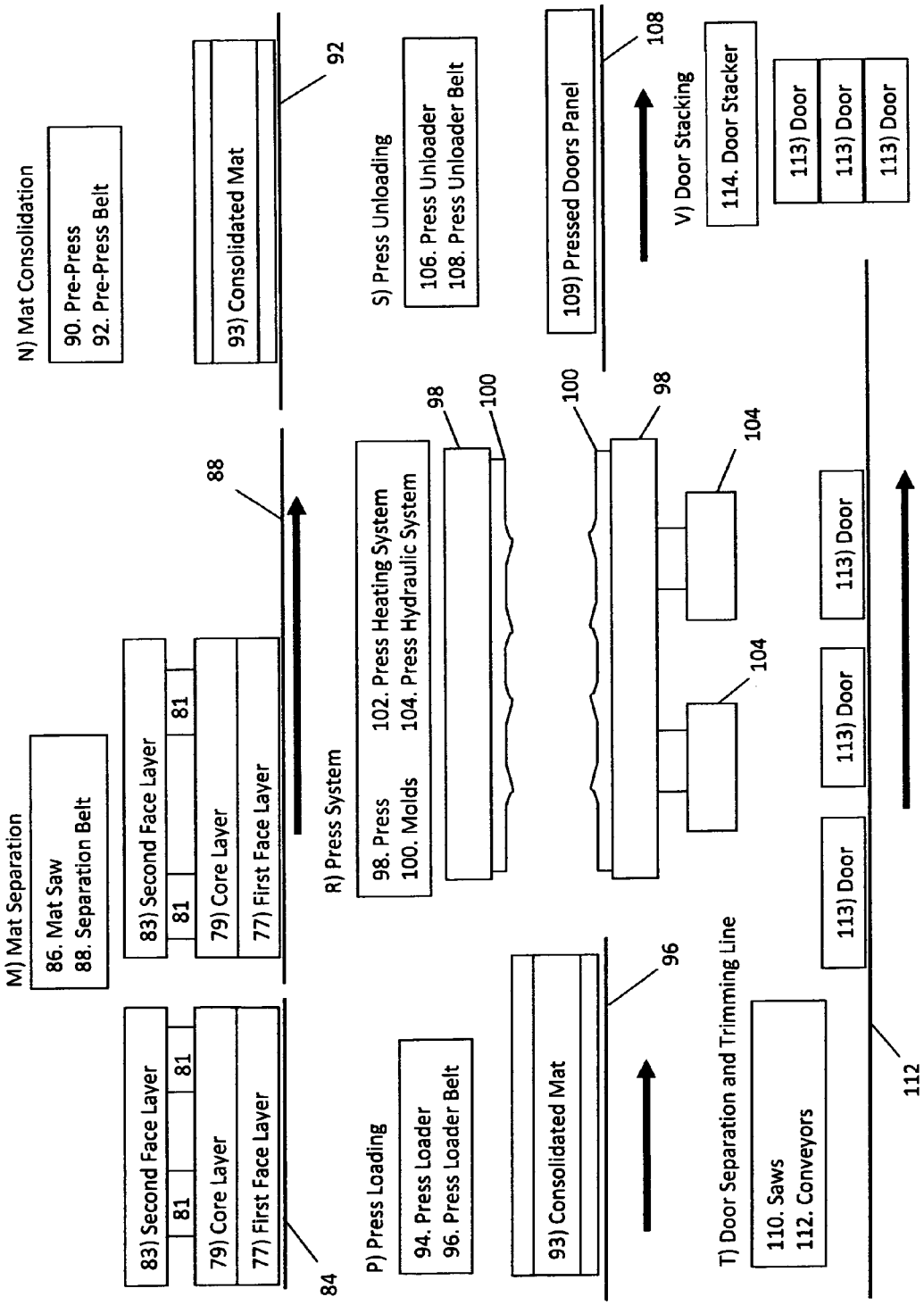
FIG. 3 is a labeled schematic diagram showing the process flow of the mat separation, pre-pressing, compression molding, and trimming processes of the manufacturing process of a second embodiment of the invention.

FIG. 3 is a labeled schematic diagram that shows the process flow of a second embodiment wherein the mat separation, mat consolidation, pressing, trimming, and stacking portions of the manufacturing process are shown.

With reference to FIG. 3, in mat separation Step M, the layered mat is transferred from the mat forming belt (84) to the separation belt (88) which is running at a speed that matches that of the mat forming belt (84). When the correct length of mat has traveled onto the separation belt (88) the mat saw (86) cycles and cuts the layered mat to size. The separation belt (88) then temporarily speeds up and separates the cut section of layered mat and transfers it to the pre-press belt (92).

Mat consolidation, step N, is an optional step where the separated section of layered mat is carried by the pre-press belt (92) and stopped at a position under the pre-press (90). The pre-press (90) cycles and compresses the layered mat to compact it and utilizes the tack of the resins to create a consolidated mat (93) with sufficient structural integrity that it can be loaded into the press system without fracturing. The pre-press (90) opens and the pre-press belt (92) then transfers the consolidated mat (93) to the press loader belt (96).

Press loading, step P, is where the consolidated mat (93) is transferred into the press system for step R. The consolidated mat (93) is carried on the press loader belt (96) into the press loader (94). When the press (98) is open and empty, the press loader (94) travels with the press loader belt (96) and consolidated mat (93) on it into the press (98). The press loader (94) then begins to withdraw from the press (98) and the press loader belt (96) runs at a rate than matches the speed at which the press loader (94) is moving out of the press. The result is that the consolidated mat (93) is deposited smoothly onto the lower half of the molds (100) located in the press (98). The press loader (94) then returns to its normal position to receive the next consolidated mat (93).

The press system, step R, is where the consolidated mat (93) is compression molded into doors. After the press loader (94) has cleared the press (98) containing the molds (100) the press hydraulic system (104) is operated and the press (98) closes and compresses the consolidated mat (93) between the molds (100) steadily until the desired gap distance between the molds (100) (for example 1.125", 1.375" or 1.750") is achieved. The pressure required to compress the mat between the molds (100) to target thickness can be in a range from about 200 to about 700 psi with higher pressures preferred as it allows for greater control of the rate of closure and the ability to achieve final thickness well in advance of the resins in the consolidated mat beginning to cure. The actual amount of pressure required is dependent on the final intended density of the door, with higher density requiring greater pressure, and the rate of compression required, with more rapid compression requiring greater pressure. The press (98) and molds (100) are heated by the press heating system (102) to temperatures of about 210° to 410° F., with 340° to 385° being the preferred range, which is sufficient to transfer heat into the compressed mat for the activation of the thermo-set resins the mat contains. The consolidated mat (93), once compressed to thickness, is held there until sufficient time has passed, generally about 4 to 15 minutes, to raise the temperature of the core center to the 210° to 240° temperature required to activate the thermo-set binding resin in the core. The actual press time used will be determined by the intended thickness of the door being produced, with thicker doors taking longer, and the curing speed of the resin used in the core. When the press cycle is complete the press (98) opens and the pressed doors panel (109) is ready to be removed from the press (98).

Press unloading, step S, is where the press unloader (106) removes the pressed doors panel (109) from the press (98). The pressed doors panel (109), which is a single panel that contains multiple doors, is deposited onto the press unloader belt (108) by the press unloader (106). The press unloader belt (108) then carries the pressed doors panel (109) to the door separation and trimming line, step T.

The door separation and trimming line, step T, is where a series of saws (110) and conveyors (112) cut the pressed doors panel (109) into individual doors (113). Some common sizes of doors are 24", 30", 32", or 36" wide and 78", 80", 84" or 96" high. The doors (113) are then carried by the conveyors (112) to the door stacker (114).

Door stacking, step V, is where the individual doors (113) are stacked on pallets or runners for strapping into units and prepared for shipment. This completes the manufacturing process.

Figure 4:
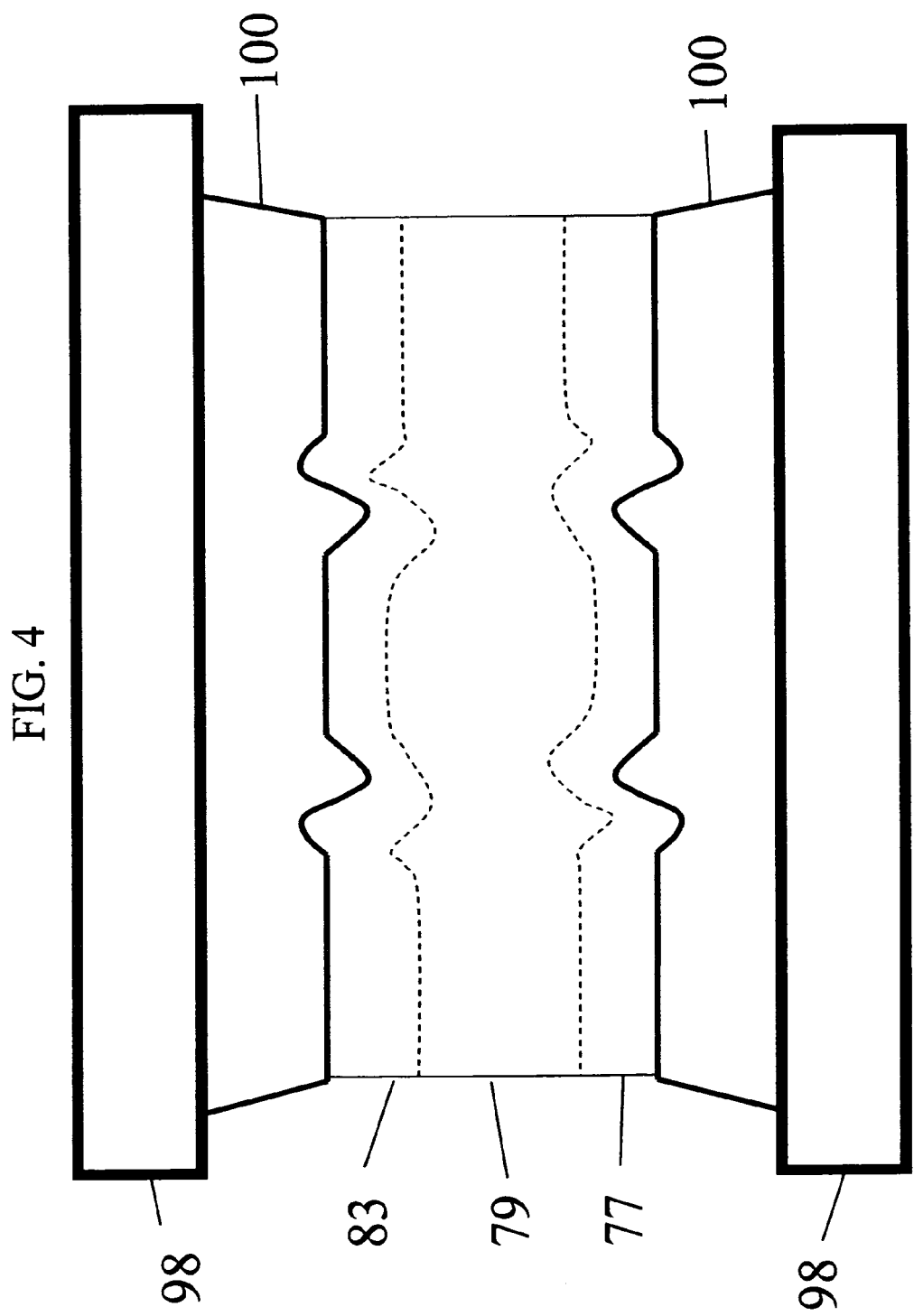
FIG. 4 is a cross section showing the layered mat compressed between the open molds in the heated press.

FIG. 4 shows a cross section of the layered mat (77, 79, and 83) compressed between the molds (100) in the heated press (98). With reference to FIG. 4, the upper platen of the press (98) is heated and has the upper half of the molds (100) attached to it. Similarly, the lower platen of the press (98) is heated and has the lower half of the molds (100) attached to it. The second face layer (83) and first face layer (77) are in intimate contact with the upper half of the mold (100) and lower half of the mold (100) faces, respectively, during pressing. The thermo-set molding resins in these layers are activated by the heat in the platens and molds and form uniform hard, smooth surface layers that accurately replicate the surfaces of the molds. The molds can be made from steel, aluminum, or other suitable materials and may contain wood grain patterns, projected detail, depressions, or some other relief. The core layer (79) has been compressed to different thicknesses and as a result there are variations in the density of the core material within the molded door. The thermo-set binding resins in the core are also heat activated and bind the wood particles in the core together so that they retain the shape of the molds and work in concert with the thermo-set molding resins in the face layers to firmly bind the surfaces to the core.

Figure 5:
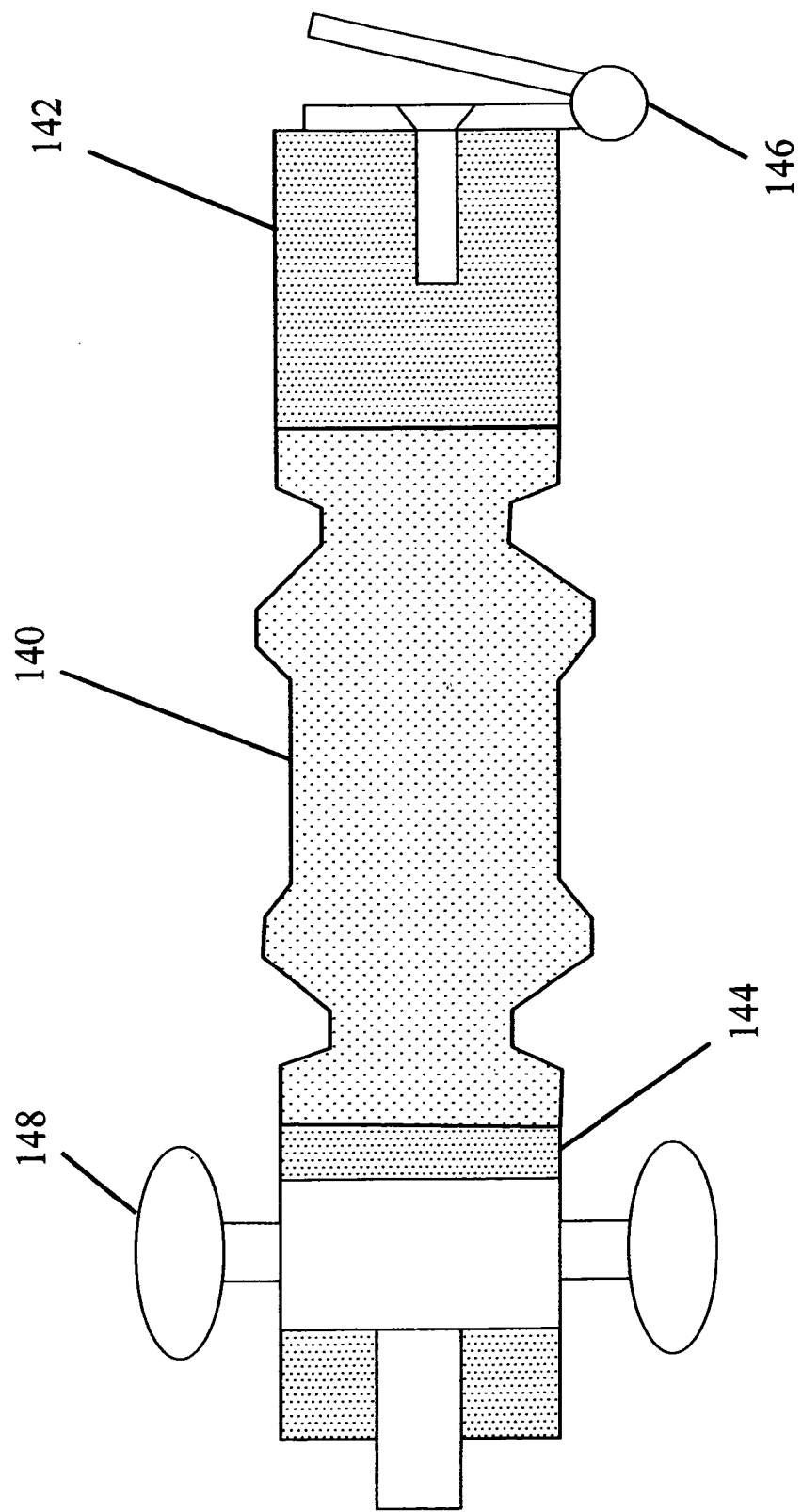
FIG. 5 depicts a cross section of a finished molded door with additional core material added in the stile areas with hinges and lockset installed.

FIG. 5 shows a cross section of a finished molded door. With reference to FIG. 5, the center portion of the door (140) contains molded decorative relief on both faces designed to simulate the stiles, rails, and panels of a traditional wood door. The core of this portion of the door contains core material deposited by only core feeder 1 (78) during the manufacturing process. The hinge stile (142) and lock stile (144) contain both the core material deposited by core feeder 1 (78) and the additional core material deposited by core feeder 2

(80) and as a result these regions have increased density (40 to 48 pounds per cubic foot versus 32 to 42 pounds per cubic foot for the center section of the door). This increase in density improves the ability of the hinge stile (142) to securely hold the screws used to mount the hinges (146) that secure the door to the jamb and the lock stile (144) to secure the lockset and latch (148).

FIG. 6 is a cross section of a finished molded door. With reference to FIG. 6, the door (150) contains the only the core material deposited by core feeder 1 (78) during the manufacturing process. In the stile edges of the door (150) wood inserts (152) have been installed that run the full length of each stile edge. The wood inserts have been installed by machining out a slot down the length of the stile edge, applying a commercial adhesive, and then inserting the wood insert (152) into the slot.

An alternate method that may be used to prepare the core fiber is to replace the coarse wood particles used in the core with wood fibers produced by processing the wood materials from the first storage silo (6) through a refiner that converts them into fibers. The fibers are then blended with thermo-set binding resin and wax as they exit the refiner. The blended fibers are then dried in a flash tube dryer and transported to core feeder 1 bin (70) and core feeder 2 bin (72).

EXAMPLES

The embodiments disclosed above are further illustrated by the following non-limiting examples.

Example 1

Wood waste produced by a cabinet component manufacture was dried to 5 percent moisture and passed through an 8-mesh screen and a 35-mesh screen. The minus 35-mesh material was mixed with Plenco® 14695 phenol-formaldehyde molding resin to produce a face layer blend of 80 percent wood and 20 percent resin by weight. The minus 8-mesh material was mixed with GPO urea-formaldehyde binding resin to produce a core blend of 88 percent wood and 12 percent resin by weight. A layered mat was produced by first applying surface blend at a rate of 0.25 pounds per square foot. Over the first layer a second layer of core blend was applied at a rate of 4.5 pounds per square foot. Over the first two layers a second layer of surface blend was applied at a rate of 0.25 pounds per square foot. The mat was placed between molds heated to 350° F. and pressed at a pressure of 300 psi to a thickness of 1.375" and held for 15 minutes. The press was opened and the molded door removed from the press. The door produced had accurately reproduced the shape of the molds and the surface of the door was hard, not scratching when subjected to a sharpened stylus test load of 85 grams, and paint-ready, with 98 of 100 squares retained.

Example 2

Wood waste produced by a cabinet component manufacture was dried to 5 percent moisture and passed through a 20-mesh screen and a 60-mesh screen. The minus 60-mesh material was mixed with Perstorp® melamine-formaldehyde molding resin to produce a face layer blend of 50 percent wood and 50 percent resin by weight. The minus 20-mesh material was mixed with BASF® MDI binding resin to produce a core blend of 92 percent wood and 8 percent resin by weight. A layered mat was produced by first applying surface blend at a rate of 0.5 pounds per square foot. Over the first layer a second layer of core blend was applied at a rate of 5.0 pounds per square foot. Over the first two layers a second layer of surface blend was applied at a rate of 0.5 pounds per square foot. The mat was placed between molds heated to 350° F. and pressed at a pressure of 600 psi to a thickness of 1.375" and held for 15 minutes. The press was opened and the molded door removed from the press. The door produced had accurately reproduced the shape of the molds and the surface of the door was hard, not scratching when subjected to a sharpened stylus test load of 85 grams, and paint-ready, with 99 of 100 squares retained.

Example 3

Wood waste produced by a cabinet component manufacture was dried to 5 percent moisture and passed through an 8-mesh screen and a 60-mesh screen. The minus 60-mesh material was mixed with Perstorp® melamine-formaldehyde molding resin to produce a face layer blend of 50 percent wood and 50 percent resin by weight. The minus 8-mesh material was mixed with GP® phenol-formaldehyde binding resin to produce a core blend of 90 percent wood and 10 percent resin by weight. A layered mat was produced by first applying surface blend at a rate of 0.5 pounds per square foot. Over the first layer a second layer of core blend was applied at a rate of 5.25 pounds per square foot. Over the first two layers a second layer of surface blend was applied at a rate of 0.5 pounds per square foot. The mat was placed between molds heated to 350° F. and pressed at a pressure of 600 psi to a thickness of 1.375" and held for 15 minutes. The press was opened and the molded door removed from the press. The door produced had accurately reproduced the shape of the molds and the surface of the door was hard, not scratching when subjected to a sharpened stylus test load of 85 grams, and paint-ready, with 99 of 100 squares retained.

Although one detailed embodiment of the present invention is disclosed herein, it is to be understood that the disclosed embodiment is merely exemplary of the invention, which may be embodied in other forms. Therefore, specific structural and functional details disclosed herein are not to be interpreted as limiting, but merely as a basis for the claims. It is also a representative basis for teaching one skilled in the art to employ the present invention in any appropriately detailed structure. For example, similar materials and processes can be used to produce molded panels or other planar objects for use in tables, cabinets, decorative wall panels, and other furniture components.

In the foregoing description, certain terms have been used for brevity, clearness and understanding. All equivalent relationships to those illustrated in the drawings and described in the preferred embodiment are to be encompassed by this present invention to produce the intended results. It is also to be understood that the following claims are intended to cover all of the generic and specific features of the invention herein described, and all statements of the scope of the invention which, as a matter of language, might be said to fall therebetween.

I claim:

1. Solid core molded planar objects produced by a composite manufacturing process employing a compression method of forming said planar objects between two molds using composite materials comprising mixtures of particles and/or fibers prepared from agricultural or forest byproducts and thermo-set resins, comprising the steps of:

preparing and applying a first face layer of a first composite material comprising from about 10 to about 60 percent by weight of a thermo-set molding resin and from about 40 to about 90 percent by weight of dried fine particles of said byproducts which have passed a screen of from about 35 to about 60 Tyler mesh by applying the first face layer composite material over a first mold at a controlled application rate in the range of from about 0.2 to about 0.7 pounds of material per square foot, preparing and applying a core layer comprising a composite material comprising from about 5 to about 20 percent by weight of a thermo-set binding resin and from about 80 to about 95 percent by weight of dried coarser particles of said byproducts which will pass a screen of from about 8 to about 20 Tyler mesh but will not pass a screen of from about 35 to about 60 Tyler mesh at a controlled application rate in the range of from about 1.5 to about 6 pounds of material per square foot to cover said first face layer, preparing and applying a second face layer comprising from about 10 to about 60 percent by weight of said thermo-set molding resin and from about 40 to about 90 percent by weight of said fine particles at a controlled application rate in the range of from about 0.2 to about 1.5 pounds of material per square foot to cover said core layer, then placing a second mold over said first mold and said face and core layers to contain and compress the layers of composite materials, and heating said molds to a temperature in the range of from about 210 to about 410 degrees F. while compressing said layers between said molds at a pressure in the range of from about 300 to about 900 psi to a predetermined final thickness and holding for a time effective to cure said composite materials, including said core layer, to form smooth, hard surfaces that are absent of any surface voids and ready to be primed and painted or powder-coated without the need for sanding or other surface preparation.

2. The product of claim 1 wherein said particles and/or fibers are prepared from agricultural byproducts and/or forest byproducts.

3. The product of claim 1 wherein said thermo-set molding resins comprise at least one aminoplast or phenolic resin selected from the group consisting of phenol-formaldehyde resins, urea-formaldehyde resins and melamine-formaldehyde resins.

4. The product of claim 1 wherein said thermo-set binding resin comprises at least one aminoplast or phenolic resin selected from the group consisting of urea-formaldehyde resins, phenol-formaldehyde resins and melamine-formaldehyde resins.

5. The product of claim 1 wherein at least one of said molds comprises a molding surface containing concave and/or convex relief patterns.

6. The product of claim 1 wherein said planar molded object is a door.

7. A product in accordance with claim 6, wherein fire retardant chemicals selected from the group consisting of boric acid, zinc chloride and other commercial fire retardants are added to the composite materials of the face and/or core layers in quantities effective to produce a molded planar object that is a fire rated door.

8. The product of claim 6 wherein additional portions of said core layer composite material are placed within said core layer between specific areas of said first face layer and said second face layer to increase the density of the cured composites and the strength of said door in areas comprising locations for hinge and lockset retention, while maintaining said predetermined final thickness.

9. The product of claim 1 wherein the composite material comprising the first face layer and the core layer is consolidated by pre-pressing the layers prior to either heating or loading these layers in a molding press.

10. The product of claim 1 wherein said particles and/or fibers are divided into fine and coarse particles, according to the requirements of said molded planar object, by passing them through a hammermill and screening said particles with screens comprising fine and coarse screens.

11. A planar molded object comprising two face layers of cured composite materials comprising from about 10 to about 60 percent by weight of a thermo-set molding resin and from about 40 to about 90 percent by weight of dried fine particles and/or fibers prepared from agricultural or forest byproducts, wherein said fine particles have passed a screen of from about 35 to about 60 Tyler mesh, and a first face layer was formed by applying said composite material at a controlled application rate in the range of from about 0.2 to about 0.7 pounds of material per square foot and a second face layer was formed by applying said composite material at a controlled application rate in the range of from about 0.2 to about 1.5 pounds of material per square foot, said face layers enclosing a core layer of cured composite material comprising from about 5 to about 20 percent by weight of a thermo-set binding resin and from about 80 to about 95 percent by weight of dried coarse particles and/or fibers prepared from said agricultural or forest byproducts, wherein said coarse particles have passed a screen of from about 8 to about 20 Tyler mesh but will not pass a screen of from about 35 to about 60 Tyler mesh, and wherein said core layer was formed by applying said composite material at a controlled application rate in the range of from about 1.5 to about 6 pounds of material per square foot.

12. The planar molded object of claim 11 which is a door.

13. The door of claim 12, having a relief pattern molded into at least one surface.

14. A solid core molded door produced by a molded composite manufacturing process employing a compression method of forming said molded doors between two molds using composite materials comprising mixtures of particles and/or fibers prepared from agricultural or forest byproducts and thermo-set resins, comprising the steps of:

preparing and applying a first face layer of a composite material comprising from about 10 to about 60 percent by weight of a thermo-set molding resin selected from the group consisting of melamine-formaldehyde resins, urea-formaldehyde resins and phenol-formaldehyde resins, wherein said molding resin is formulated to have a prolonged thermoplastic phase that allows the resin to flow and conform to the shape of the mold prior to its cross linking and curing, and from about 40 percent to about 90 percent by weight of dried fine particles of said byproducts which have passed through a screen of from about 35 to about 60 Tyler mesh by applying the first face layer composite material over a first mold, preparing and applying a core layer comprising a composite material comprising from about 5 to about 20 percent by weight of a thermo-set binding resin selected from the group consisting of urea-formaldehyde resins, phenol-formaldehyde resins, melamine-formaldehyde resins and from about 80 to about 95 percent by weight of dried coarser particles of said byproducts which have passed a screen of from about 8 to about 20 Tyler mesh but will not pass a screen of from about 35 to about 60 Tyler mesh to cover said first face layer, preparing and applying a second face layer comprising from about 10 to about 60 percent by weight of said thermo-set molding resin and from about 40 to about 90 percent by weight of said dried fine particles to over said core layer, then placing a second mold over said first mold and said face and core layers to contain and compress the layers of composite materials, and then heating said molds to a temperature in the range of from about 210 to about 410 degrees F. while compressing said layers between said molds at a pressure in the range of from about 300 to about 900 psi effective to compress said layers of composite materials to a predetermined final thickness well in advance of the resins in the consolidated mat beginning to cure, and for a time effective to cure said composite materials in said core layer and said surface layers and form a solid composite door.

15. The solid molded door of claim 14 which has outer surfaces hard enough to remain unscratched when stroked with a sharpened steel stylus loaded with about 85 grams weight and smooth enough to pass a chalk test.

16. The molded door of claim 14 wherein said molding resin and said binding resin are selected from different chemical species within the groups recited therein.

17. The molded object of claim 11 which has outer surfaces hard enough to remain unscratched when stroked with a sharpened steel stylus with about 85 grams weight and smooth enough to pass a chalk test.

18. The Molded object of claim 11 wherein said fine and coarse particles and/or fibers are dried to a moisture content in the range of from about 2 to 4 weight percent prior to admixture with said thermoset molding and said thermoset binding resins in the form of liquid resins.

19. The molded object of claim 11 wherein said fine and coarse particles and/or fibers are dried to a moisture content in the range of from about 5 to 8 weight percent prior to admixture with said thermoset molding and said thermoset binding resins in the form of spray dried resins.

20. The molded door of claim 16 wherein said molding resin comprises a phenol-formaldehyde resin and said binding resin comprises a urea-formaldehyde resin.

21. The molded door of claim 14 wherein said first face layer composite material is applied over a first mold at a controlled application rate in the range of from about 0.2 to about 0.7 pounds of material per square foot, the composite material for said core layer is applied at a controlled application rate in the range of from about 1.5 to about 6 pounds of material per square foot, and the composite material for said second face layer is applied at a controlled application rate in the range of from about 0.2 to about 1.5 pounds of material per square foot.

* * * * *